April 26, 1938.  D. A. DICK  2,115,196
MEAT SUSPENDING DEVICE
Filed Dec. 23, 1936
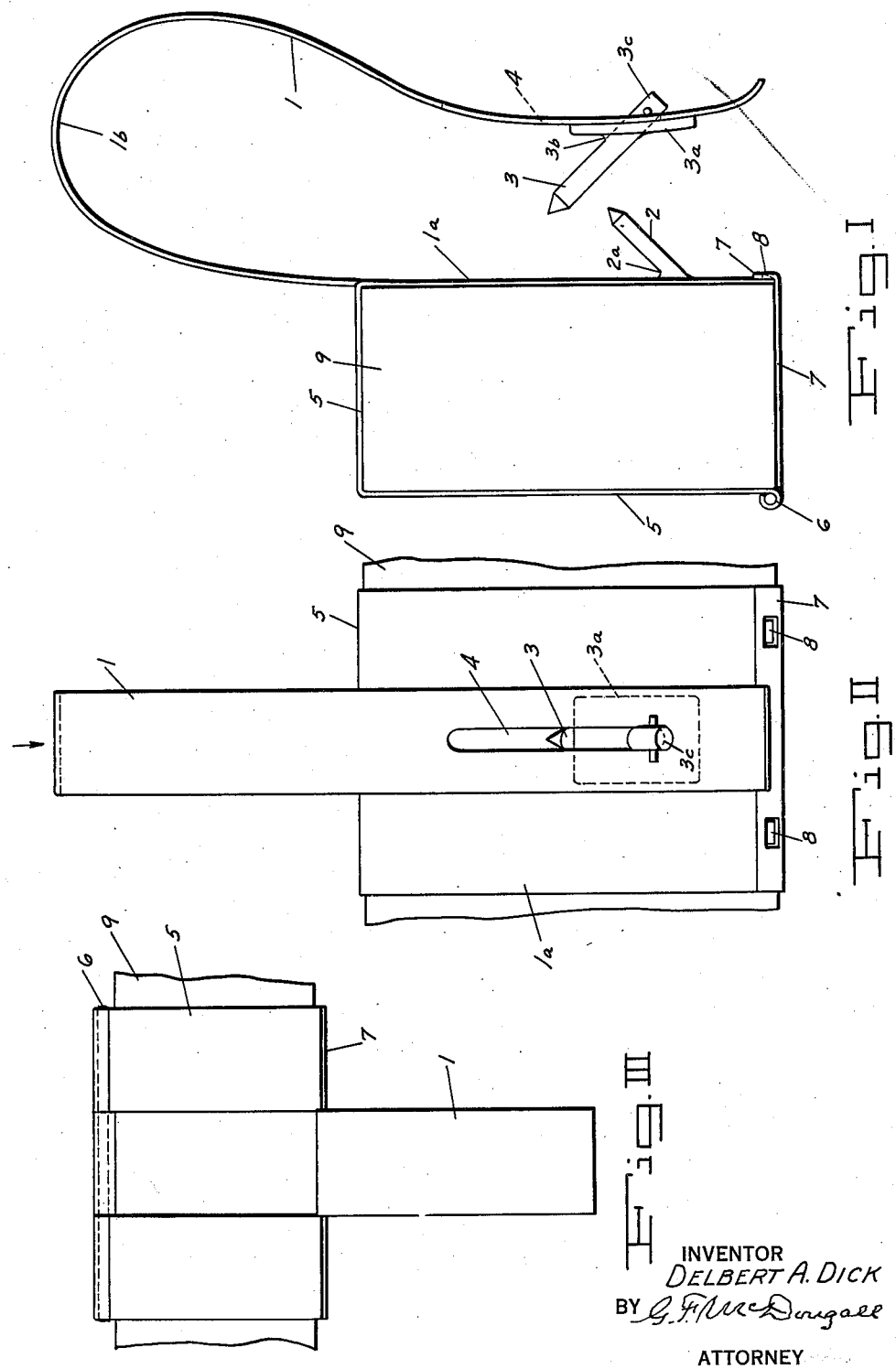
INVENTOR
DELBERT A. DICK
BY
ATTORNEY Patented Apr. 26, 1938

2,115,196

UNITED STATES PATENT OFFICE 2,115,196

MEAT SUSPENDING DEVICE

Delbert A. Dick, Portland, Oreg.

Application December 23, 1936, Serial No. 117,284

9 Claims. (Cl. 17—44.3)

This invention relates to devices for suspending cuts of meat in a cooler for ripening and/or storage and is useful particularly for loins and other pieces of meat smaller than a full quarter.

Coolers are commonly provided with a row of scantlings setting slightly out from the wall on several sides of the enclosure and fitted with metal hooks that engage the scantlings and present out and upstanding points in the form of a hook. They are used by impaling soft portions of meat on the hooks.

These hooks are usually tinned, but the tin wears off and in any event the hole in the meat must be trimmed out before it is cooked and served, resulting in a very considerable waste. Where the tin has worn off the meat will be blackened inwardly for some distance and the waste is correspondingly heavy.

The object of my invention is a device to engage the bone edge of a loin as distinguished from the soft or meat edge, and which when used on a soft piece of meat not containing bone will not necessarily penetrate the meat deeply, but will hold a piece of considerable weight without puncture of its surface.

I do this by applying points to the inside of a spring clip and suspending the clip rigidly but reversely to the way the old meat hook was suspended. To illustrate the best way in which I propose to carry out my invention, the following drawing herewith is made a part of this specification. In the drawing,—

Fig. I is a side view of my new article;

Fig. II is a right hand elevation of Fig. I; and

Fig. III is a top view of Fig. II looking downward in the direction of the arrow shown in that figure.

The essence of the device is a spring clip 1, one side of which, indicated by the numeral 1a, is preferably integral with a means for engaging the appliance with a scantling or other beam similar to what is commonly in use as hereinbefore described, and which contains pointed pins that project inwardly from both sides, so that a piece of meat, thrust into the device by springing the clip, will have the pointed pins resiliently held against both sides and will therefore be held without there being necessarily any penetration of the body of the cut of meat.

The pointed pin 2 is rigidly fixed to the element of the clip indicated by 1a, and it will be noted that it projects inwardly and upwardly into the space defined by the spring clip 1. Another pin, 3, projects upwardly and inwardly with respect to the same space defined by the clip 1, but at an opposite angle to the axis of the element 2. The angles, however, are not important within reasonable limits, to those shown.

I prefer to make the point 2 rigid with its supporting structure as by welding at 2a or in any other preferred manner; and I preferably make the point 3 rigid with a base or supporting plate 3a as by welding at 3b, or other preferred way of making the point 3 rigid with the supporting plate 3a, and project the extending end of the point 3, indicated by the numeral 3c, through the slot 4 formed in the spring clip 1 as shown in Figs. I and II. The point 3 with its supporting plate 3a, is thus capable of up and down placement with respect to the length of the slot 4.

Preferably formed of one piece with the spring clip 1 and 1a, is a box hanger portion 5, made as a good fit to the type of beam that it is to be used on. A hinge 6, supports a bottom closure member, 7, preferably arranged with a snap fastener at 8 so that when the element 5 is placed over a beam such as 9, the element 7 may be brought around and snapped into place, thus holding the spring clip rigidly in inverted position as shown in Fig. I.

To use this device, a loin of beef, for example, that it is intended to engage, is merely forced between the points 2 and 3 by an upward movement sufficient to bring the points 2 and 3, or at least the point 2, into contact with the piece of meat by the yielding of the clip 1.

The resiliency of the spring clip 1 will then cause the points to engage the article firmly and, obviously, the weight of the piece of meat tends to tighten the grip of the points 2 and 3 rather than to loosen them.

When it is desired to take the piece out of the device, another upward movement tending to outwardly flex the spring clip 1 will bring the pin 2 out of engagement with the meat when it may be withdrawn by a single motion outward and sidewise.

Mounting the pin 3 so that it is slidable in the slot 4, contributes materially to the ease with which the piece of engaged meat may be taken from the spring clip without in any manner detracting from its holding power.

The spring clip 1 should be made of a good grade of spring steel and so processed that the inner or loop portion 1b, can be flexed outwardly a very considerable amount without causing a permanent set in the metal of which it is made. The points are preferably hardened and the article as a whole will be tinned or plated as is usual with appliances intended to contact food substances.

Having thus disclosed my invention, what I claim as new and desire to secure by Letters Patent, is,—

1. A device for hanging cuts of meat comprising a box-hanger portion to non-rotatably engage a beam, an inverted spring clip made rigid with the box hanger portion that is formed to define an open bottom space at one side of said box hanger portion and a pair of points, one rigidly held by the box hanger and the other slidably held by the clip, that project angularly upwardly into the defined space.

2. A device for hanging meat comprising a box member to non-rotatively engage a beam, an inverted spring clip, made rigid therewith, that defines an open bottomed space at one side of the box member and a pair of pointed meat engaging means supported by said first named means that project into said defined spaced that are effective to hold meat inserted between the spring clip and the box member.

3. A device of the character described for hanging meat, comprising a box member, an inverted spring clip made rigid therewith and spaced therefrom, a slotted pin mounting formed in the spring clip, a pin mounted for non-turning vertical movement in the slotted portion of the clip and a pin made rigid with the box member that projects angularly upwardly into the space between said box member and said inverted spring clip.

4. A device of the character described comprising a box hanger portion, a spaced spring clip portion and a pair of oppositely projecting pins, one made rigid with the box hanger and the other movably attached to the spring clip, that are positioned to oppositely engage meat placed between the box hanger and the spring clip.

5. In a meat supporting device of the character described, a supporting member that is effective to rigidly engage a beam, an inverted spring clip member, one end of which engages the supporting member, to define an open bottomed space therebetween, a movable pin mounted on said clip member to project angularly upwardly in the space between the supporting means and the clip and an oppositely angularly projecting pin made rigid with said box supporting member.

6. A hanging device for meats, comprising a beam surrounding member, a spring clip made rigid therewith and spaced therefrom at one side and a pair of meat engaging pins, non-turnably supported to project angularly upwardly into the space between the beam surrounding member and the spring clip.

7. A device for hanging cuts of meat comprising a box-hanger portion to non-rotatably engage a beam, an inverted spring clip made rigid with the box hanger portion that is formed to define an open bottom space at one side of said box hanger portion and a pair of points, one rigidly held by the box hanger and the other slidably held by the clip, that project angularly upwardly into the defined space.

8. A meat suspending device comprising a box hanger portion arranged to latch around a rectangular beam, an inverted spring clip member made rigid with said box hanger to define an open bottom space alongside said hanger, a pair of meat engaging pins that project angularly upwardly into the defined space at substantially opposite sides of said space, one of said pins being rigidly mounted and the other slidably mounted.

9. A meat suspending device comprising a box hanger portion arranged to latch in non-rotatable position around a beam, an inverted spring clip member made rigid with said box hanger to define an open bottom space alongside said hanger, a pair of meat engaging pins that project angularly upwardly into the defined space at substantially opposite sides of said space, one of said pins being rigidly mounted and the other slidably mounted.

DELBERT A. DICK.